United States Patent
Schäfer et al.

(10) Patent No.: US 6,569,981 B1
(45) Date of Patent: May 27, 2003

(54) CRYSTALLIZING POLYETHER POLYOLS, A METHOD FOR PRODUCING THEM AND USE OF THE SAME

(75) Inventors: Walter Schäfer, Leichlingen (DE); Jörg Hofmann, Krefeld (DE); Pramod Gupta, Bedburg (DE); Pieter Ooms, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/030,489
(22) PCT Filed: Apr. 18, 2000
(86) PCT No.: PCT/EP00/03495
§ 371 (c)(1),
(2), (4) Date: Oct. 25, 2001
(87) PCT Pub. No.: WO00/66648
PCT Pub. Date: Nov. 9, 2000

(30) Foreign Application Priority Data

Apr. 28, 1999 (DE) .......................................... 199 19 267

(51) Int. Cl.$^7$ .............................................. C08G 18/48
(52) U.S. Cl. ........................... 528/77; 528/76; 528/414; 528/415; 528/416; 528/421; 568/620; 252/182.27
(58) Field of Search .............................. 528/76, 77, 42, 528/414, 415, 416; 568/620; 252/182.27

(56) References Cited

U.S. PATENT DOCUMENTS 4,962,281 A  10/1990  Laycock ...................... 528/413

FOREIGN PATENT DOCUMENTS

| DE | 1720337 | 6/1971 |
| EP | 0 862 947 | 9/1998 |
| GB | 893274 | 4/1962 |

*Primary Examiner*—Rachel Gorr
(74) *Attorney, Agent, or Firm*—Joseph C. Gil; N. Denise Brown

(57) ABSTRACT

This invention relates to crystallizing polyether polyols which can be produced firstly by the reaction of propylene oxide and polyhydroxy compounds in the presence of an alkoxy compound which contains zinc and/or aluminium atoms to form a crystallizing polyether polyol with an average molecular weight $M_n$ from 500 to 5000, followed by the further reaction of the crystallizing polyether polyol which is thus obtained with 10 to 90% by weight, with respect to the amount of crystallizing polyol, of an epoxide in the presence of a catalyst which does not polymerize propylene oxide stereospecifically, to form a crystallizing polyether polyol with an average molecular weight $M_n$ from 1000 to 20,000. The invention further relates to a method for the production thereof and to the use thereof for the production of polyurethane materials, particularly polyurethane foams, polyurethane elastomers and polyurethane coatings.

3 Claims, No Drawings

CRYSTALLIZING POLYETHER POLYOLS, A METHOD FOR PRODUCING THEM AND USE OF THE SAME

BACKGROUND OF THE INVENTION

This invention relates to crystallising polyether polyols, to a method of producing them, and to the use thereof for the production of polyurethane materials, particularly polyurethane foams, polyurethane elastomers and polyurethane coatings.

SUMMARY OF THE INVENTION

Crystallising polyether polyols, particularly poly (oxypropylene) polyols, are known and are distinguished in polyurethane (PUR) applications by an improvement in the mechanical properties of the product. One significant disadvantage of their use in PUR formulations is the high viscosity of these polyols, even in their molten state at temperatures from 60 to 100° C., which often makes it necessary to conduct reactions in solvents. The production and purification of crystallising polyether polyols is also made considerably more difficult due to their high viscosity. The high viscosity of these products is substantially caused by polymer constituents which have a particularly high molecular weight.

The object of the present invention was therefore to provide crystallising polyether polyols with a reduced viscosity, in order to avoid the aforementioned disadvantages during processing.

The object of the present invention has been achieved by the provision of new crystallising polyether polyols.

The present invention therefore relates to crystallising polyether polyols which can be produced firstly by the reaction of propylene oxide and polyhydroxy compounds in the presence of an alkoxy compound which contains zinc and/or aluminium atoms to form a crystallising polyether polyol with an average molecular weight $M_n$ from 500 to 5000, followed by the further reaction of the crystallising polyether polyol which is thus obtained with 10 to 90% by weight, with respect to the amount of crystallising polyol, of an epoxide in the presence of a catalyst, to form a crystallising polyether polyol with an average molecular weight $M_n$ from 1000 to 20,000.

The present invention further relates to a method of producing crystallising polyether polyols, which is characterised in that propylene oxide and polyhydroxy compounds are first caused to react in the presence of an alkoxy compound which contains zinc and/or aluminium atoms to form a crystallising polyether polyol with an average molecular weight $M_n$ from 500 to 5000, and the crystallising polyether polyol which is thus obtained is subsequently caused to react further with 10 to 90% by weight, with respect to the amount of crystallising polyol, of an epoxide in the presence of a catalyst which does not polymerise propylene oxide stereospecifically, to form a crystallising polyether polyol with an average molecular weight $M_n$ from 1000 to 20,000.

According to the invention, the reaction with the epoxide of the crystallising polyether polyol which is obtained as an intermediate can be effected catalytically in any desired manner, for example by acidic, basic or coordinative catalysis, preferably by alkali metal cyanide or double metal cyanide (DMC) catalysis.

Reference is made in this connection to the fact that the crystallising polyether polyol which is obtained as an intermediate can be further processed with the epoxide in the manner described, without the separation of the catalyst used in the production of said polyether polyol.

Polyhydroxy compounds which are suitable according to the invention include all the polyhydroxy compounds which are known for reaction with epoxides, particularly polyhydroxy compounds which comprise 2 to 6 hydroxyl groups per molecule and which have a molecular weight from 90 to 2000, preferably from 200 to 1500. Polyhydroxy compounds which are used in particular are polypropylene glycols, polyethylene glycols, dihydroxypolyethylene oxide-polypropylene oxide block copolymers and randomly structured EO/PO copolymers. Compounds of this type are described in Kirk-Othmer (3) 1, 754 to 789 for example.

The following are cited as preferred polyhydroxy compounds: polypropylene glycols with an average molecular weight $M_n$ from 200 to 2000 which are initiated on ethylene glycol, diethylene glycol, dipropylene glycol, propylene glycol, 1,4-butanediol, 1,6-hexanediol, glycerol, trimethylolpropane, pentaerythritol, sorbitol or saccharose, or copolymers of propylene oxide and ethylene oxide which have an average molecular weight $M_n$ from 200 to 2000 and which are initiated on ethylene glycol, propylene glycol, 1,4-butanediol, glycerol or trimethylolpropane, as well as mixtures of said polyhydroxy compounds with each other.

Catalysts which are capable of polymerising propylene oxide stereospecifically are used for the production of the crystallising polyether polyols (intermediates). These catalysts are known alkoxy compounds which contain aluminium and/or zinc atoms and which also optionally contain aluminium- and/or zinc alkyl groups, such as those which are described in the Encycl. of Polym. Sci. and Engineering 6, 284–307, for example.

The catalysts which are preferably used for stereospecific polymerisation are bimetallic μ-oxoalkoxides which contain aluminium and/or zinc atoms, such as those which are described in U.S. Pat. No. 3,432,445. The bimetallic μ-oxoalkoxides which contain aluminium and/or zinc atoms and which are used in particular are those which are termed Teyssie catalysts and which correspond to the general formula given below:

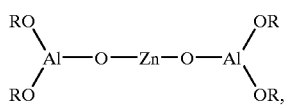

wherein

R represents a $C_2$–$C_{12}$ alkyl radical.

Examples of suitable alkyl radicals include: ethyl, propyl, isopropyl, butyl, isobutyl pentyl, hexyl, decyl, undecyl and dodecyl radicals, preferably propyl, isopropyl, butyl and isobutyl radicals.

Before use, the alkoxy compounds described above which contain aluminium and/or zinc atoms are generally treated and modified with the initiator polyol (as described in DE 19 748 359).

The following substances are preferably used as catalysts for the subsequent, non-stereospecific reaction of the epoxides with the crystallising polyether polyols which are obtained as an intermediate: alkali hydroxides such as potassium and/or caesium hydroxides, alkaline earth hydroxides such as strontium and/or barium hydroxides, and double metal cyanide (DMC) catalysts (see Kirk-Othmer (3) 18, pages 616 to 645).

Double metal cyanide catalysts which are suitable for the polyaddition of epoxides to the crystallising polyether polyols obtained as intermediates are generally known (see, for example, U.S. Pat. Nos. 3,404,109, 3,829,505, 3,941,849 and 5,158,922). Compared with the conventional production of polyether polyols by means of alkaline catalysts such as alkali hydroxides, the use of these DMC catalysts for the production of polyether polyols results in particular in a reduction of the proportion of monofunctional polyethers comprising terminal double bonds, which are termed monools. DMC catalysts are usually obtained by the reaction of an aqueous solution of a metal salt with the aqueous solution of a metal cyanide salt in the presence of a low molecular weight organic complexing ligand, e.g. an ether. In a typical catalyst preparation, for example, aqueous solutions of zinc chloride (in excess) and potassium hexacyanocobaltate are mixed, and dimethoxyethane (glyme) is subsequently added to the suspension which is formed. After filtration and washing of the catalyst with an aqueous solution of glyme, an active catalyst is obtained, of general formula $$Zn_3[Co(CN)_6]_2 \cdot xZnCl_2 \cdot yH_2O \cdot z \text{ glyme}$$

(see EP 700 949).

Improved DMC catalysts, such as those which are described, for example, in EP-A 700 949, EP-A 743 093, EP-A 761 708, WO 97/40086, WO 98/16310, DE-A 197 45 120, DE-A 197 57 574 and DE-A 198 102 269, possess an extraordinarily high activity in addition and enable polyether polyols to be produced at a very low catalyst concentration, so that it is no longer necessary to separate the catalyst from the polyol.

The epoxides which are preferably used for the addition reaction to the intermediate are propylene oxide, butylene oxide, ethylene oxide or styrene oxide. Propylene oxide is most preferably used. Mixtures of epoxides with each other can also of course be used.

To effect the aforementioned modification of the alkoxy compounds which contain aluminium and/or zinc atoms, these compounds are reacted with the initiating polyol at about 20 to 200° C., with substitution of the alkoxy radical, or of the alkyl radical also, by the initiator polyol. The reaction of the catalysts is conducted in a manner such that one equivalent of initiator polyol is reacted with an amount of catalyst which contains $10^{-3}$ to 1 mol aluminium and/or zinc in total, preferably $10^{-2}$ to 0.6 mol in total. The use of alkoxy compounds which contain modified Al and/or Zn atoms is preferred. The alcohols which are formed during the substitution reaction, and also the alkanes which are possibly formed, are removed by heating under vacuum.

Propylene oxide is then added to the "Teyssie catalysts" which are preferably used and which are modified with an initiator polyol, i.e. with the aforementioned polyhydroxy compounds. The propylene oxide is added at 50 to 150° C., preferably at 80 to 160° C., under a total pressure of 0.5 to 20 bar, preferably 1 to 5 bar, in an amount (g) such that the sum of the amount of initiator polyol in g and the amount of propylene oxide in g divided by the moles of initiator polyol is equal to 600 to 3000, preferably 800 to 2500 g per mol.

In a preferred embodiment, after the polyether polyol, which crystallises at about 20 to 60° C., preferably at 20 to 40° C., and which has an average molecular weight $M_n$ from 500 to 5000, preferably 600 to 3000, has been obtained as an intermediate, this product is subsequently treated, as mentioned above, with an alkali hydroxide and/or with an alkaline earth hydroxide as a base, wherein 0.1 to 2 g, preferably 0.2 to 1 g, of base are used per 100 g of the polyether polyol which is obtained. Water or volatile organic compounds which are formed during the addition are optionally removed by heating under vacuum.

The intermediate can be freed from catalyst before the further addition of epoxides, e.g. by reaction with acids and by separating the metal salts formed. A method in which the catalyst is separated from the final product is preferred, however.

The addition of the epoxide to the crystallising polyether polyol which is obtained as an intermediate can be effected under normal pressure or under a total pressure from 0.5 to 20 bar, preferably 1 to 5 bar (absolute), and at a temperature of 80 to 200° C., preferably 90 to 150° C., wherein the amount of epoxide is calculated so that a hydroxypropyl ether is produced which has an average molecular weight $M_n$ from 1000 to 20,000, preferably 1500 to 10,000, as determined by GPC (using polystyrene as a standard) or as determined via the content of terminal hydroxy groups.

According to another preferred embodiment of the invention, instead of employing alkaline catalysis, the reaction of the epoxide with the crystalline polyether polyol which is obtained as an intermediate can be effected by employing catalysis by means of a double metal cyanide catalyst. Here also, there is preferably no intermediate separation of the catalyst which contains aluminium and/or zinc atoms.

In the course of this procedure, the concentration of double metal cyanide catalyst is preferably selected so that it is possible to achieve good control of the polyaddition of the epoxide under the given reaction conditions. The catalyst concentration generally falls within the range from 0.0005 to 1% by weight, and preferably falls within the range from 0.001 to 0.1% by weight, with respect to the amount of polyether polyol to be produced. Polyaddition in the presence of double metal cyanide catalysts can be conducted at total pressures from 0.5 to 20 bar, preferably from 1 to 5 bar, and at temperatures from 50 to 200° C., preferably from 70 to 160° C.

One option for the reaction of the partially crystalline polyether polyol with propylene oxide, for example, is successively to introduce the mixture comprising the catalyst, the partially crystalline polyether polyol and the propylene oxide, which can also contain a solvent, into a reactor in a manner such that after the commencement of the exothermic reaction the rapid dissipation of heat is ensured, e.g. via reactor surfaces of large area. The mixture can also be maintained in circulation in order to complete the reaction.

After the reaction with the epoxide, the polyether polyol which is produced according to the invention is treated with an aqueous acid to remove or reduce the metal content, wherein the pH is adjusted to a value $\leq 6$. This is only applicable, of course, if the catalysts which contain aluminium and/or zinc atoms have not already been removed following the production of the intermediate. The metal salts which are formed are removed from the polyether polyol by extraction with water or by precipitation, optionally with the addition of suitable solvents, e.g. toluene. Suitable acids include hydrochloric acid, phosphoric acid, sulphuric acid, benzoic acid, citric acid and/or lactic acid, etc. Examples of other forms of work-up, which are less preferred, include treatment with ion exchangers or with adsorbents.

The polyaddition reaction between the epoxide and the polyether polyol which is obtained as an intermediate can be conducted in bulk or in an inert organic solvent such as toluene and/or tetrahydrofuran. The amount of solvent usually ranges from 10 to 30% by weight with respect to the amount of polyether polyol to be produced.

The crystallising polyether polyols which are produced by the method according to the invention are outstandingly suitable for the production of polyurethane materials, such as PUR elastomers, PUR foams and PUR coatings for example. The production of the aforementioned PUR materials is known and is described, for example, in the Kunststoff-Handbuch, Volume 7, 3rd Edition, Carl Hanser Verlag, 1983.

It must be considered to be surprising that polyether polyols which crystallise above 20° C. can successfully be obtained, the crystallisation properties of which are retained even though the crystallising polyether polyols for reducing the viscosity (by more than 50%) which are obtained in the first step are subsequently further polymerised with epoxides in a non-stereospecific reaction.

EXAMPLES

Example 1

40 parts of a 0.35 molar solution of di-$\mu$-oxo[bis(1-methylethyloxy)-aluminium]zinc were added to 440 parts of a hydroxypolyether based on propylene oxide, which was initiated on trimethylolpropane and which had an OH number corresponding to 380 mg KOH/g, and the batch was heated for 3 hours at 130° C. The reaction mixture was cooled to 95° C. and a vacuum (0.3 mbar) was applied for one hour. 100 parts toluene were added and the toluene was subsequently distilled off again at 0.3 mbar until a temperature of 130° C. was reached.

Thereafter, 400 parts propylene oxide were added drop-wise at 110° C., in a manner such that the temperature did not fall below 80° C.

0.1 parts of a double metal cyanide catalyst (prepared according to EP 743 093) were subsequently added, and 1160 parts propylene oxide were added drop-wise at 110° C. thereafter.

When no more refluxing material could be ascertained, the product was taken up in methylene chloride and was treated with 10% sulphuric acid until the pH of the crude product was <5, followed by washing with water. The product was neutralised with an aqueous bicarbonate solution and was washed with water. The organic phase was separated and freed from solvent.

The product, which crystallised at 25° C., had an $M_n$ of 2190 as determined by GPC using polystyrene as a standard) and had a viscosity corresponding to $\eta$=260 mPas (60° C.).

Comparative Example 40 parts of a 0.35 molar solution of di-$\mu$-oxo[bis(1-methylethyloxy)-aluminium]zinc were added to 440 parts of a hydroxypolyether based on propylene oxide, which was initiated on trimethylolpropane and which had an OH number corresponding to 380 mg KOH/g, and the batch was heated for 3 hours at 130° C. The reaction mixture was then cooled to 95° C. and a vacuum (0.3 mbar) was applied for one hour. 100 parts toluene were added and the toluene was subsequently distilled off again at 0.3 mbar until a temperature of 130° C. was reached.

Thereafter, 1560 parts propylene oxide were added drop-wise at 110° C. When no more refluxing material could be ascertained, the product was taken up in methylene chloride and was treated with 10% sulphuric acid until the pH of the crude product was <5, followed by washing with water. The product was neutralised with an aqueous bicarbonate solution and was washed with water. The organic phase was freed from solvent.

The product, which crystallised at 25° C., had an $M_n$ of 2230 as determined by GPC (using polystyrene as a standard) and had a viscosity corresponding to $\eta$=16800 mPas (60° C.).

Example 2

40 parts of a 0.35 molar solution of di-$\mu$-oxo[bis(1-methylethyloxy)-aluminium]zinc were added to 420 parts of a hydroxypolyether based on propylene oxide, which was initiated on propylene glycol and which had an OH number corresponding to 265 mg KOH/g, and the batch was heated for 3 hours at 130° C. The reaction mixture was cooled to 95° C. and a vacuum (0.3 mbar) was applied for one hour. 100 parts toluene were added and the toluene was subsequently distilled off again at 0.3 mbar until a temperature of 130° C. was reached.

Thereafter, 750 parts propylene oxide were added drop-wise at 110° C., in a manner such that the temperature did not fall below 80° C. 0.05 parts of a double metal cyanide catalyst were added, and 850 parts propylene oxide were added drop-wise at 110° C. thereafter.

When no more refluxing material could be ascertained, the product was taken up in toluene and was treated with 10% sulphuric acid until the pH of the crude product was <5, followed by washing with water.

The product was neutralised with an aqueous bicarbonate solution and was washed with water. The organic phase was separated and freed from solvent.

The product, which crystallised at 25° C., had an $M_n$ of 2150 as determined by GPC (using polystyrene as a standard) and had a viscosity corresponding to $\eta$=510 mPas (60° C.).

Example 3

40 parts of a 0.35 molar solution of di-$\mu$-oxo[bis(1-methylethyloxy)-aluminium]zinc were added to 440 parts of a hydroxypolyether based on propylene oxide, which was initiated on glycerol and which had an OH number corresponding to 250 mg KOH/g, and the batch was heated for 3 hours at 130° C. The reaction mixture was cooled to 95° C. and a vacuum (0.3 mbar) was applied for one hour.

100 parts toluene were added and the toluene was subsequently distilled off again at 0.3 mbar until a temperature of 130° C. was reached.

Thereafter, 400 parts propylene oxide were added drop-wise at 110° C., in a manner such that the temperature did not fall below 80° C.

0.02 parts of a double metal cyanide catalyst were subsequently added, and 1000 parts propylene oxide were added drop-wise at 110° C. thereafter.

When no more refluxing material could be ascertained, the product was taken up in toluene and was treated with 10% sulphuric acid until the pH of the crude product was <5, followed by washing with water.

The product was neutralised with an aqueous bicarbonate solution and was washed with water. The organic phase was separated and freed from solvent.

The product, which crystallised at 25° C., had an $M_n$ of 3406 as determined by GPC (using polystyrene as a standard) and had a viscosity corresponding to $\eta$=670 mPas (60° C.).

What is claimed is:

1. Crystallising polyether polyols with an average molecular weight $M_n$ from 1000 to 20,000 which comprise the reaction product of: (A) a crystallising polyether polyol with an average molecular weight $M_n$ from 500 to 5000 formed by reacting: propylene oxide with polyhydroxy compounds, in the presence of an alkoxy compound which contains zinc and/or aluminium atoms, with (B) 10 to 90% by weight, with respect to the amount of crystallising polyol, of an epoxide, in the presence of a catalyst which does not polymerise propylene oxide stereospecifically, to form said crystallising polyether polyol with an average molecular weight $M_n$ from 1000 to 20,000.

2. A method of producing crystallising polyether polyols with an average molecular weight $M_n$ from 1000 to 20,000, comprising:

(1) reacting propylene oxide with polyhydroxy compounds, in the presence of an alkoxy compound which contains zinc and/or aluminium atoms, to form a crystallising polyether polyol with an average molecular weight $M_n$ from 500 to 5000, and, subsequently, (2) reacting the crystallising polyether polyol obtained in (1) with 10 to 90% by weight, with respect to the amount of crystallising polyol, of an epoxide, in the presence of a catalyst which does not polymerise propylene oxide stereospecifically, thereby forming a crystallising polyether polyol with an average molecular weight $M_n$ from 1000 to 20,000.

3. In a process for the production of polyurethane materials comprising reacting a polyisocyanate component with an isocyanate-reactive component, the improvement wherein said isocyanate-reactive component comprises the crystallising polyether polyols of claim 1.

* * * * *